(12) United States Patent
Kim et al.

(10) Patent No.: US 12,340,038 B2
(45) Date of Patent: Jun. 24, 2025

(54) TOUCH DISPLAY DEVICE

(71) Applicant: SAMSUNG ELECTRONICS CO., LTD., Suwon-si (KR)

(72) Inventors: Jinbong Kim, Suwon-si (KR); Byunghwee Park, Suwon-si (KR); Yeonwoo Ku, Suwon-si (KR); Minsung Kim, Suwon-si (KR); Heejin Lee, Suwon-si (KR); Yunrae Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/227,048

(22) Filed: Jul. 27, 2023

(65) Prior Publication Data

US 2024/0201808 A1 Jun. 20, 2024

(30) Foreign Application Priority Data

Dec. 15, 2022 (KR) ........................ 10-2022-0176214

(51) Int. Cl.
*G09G 3/3233* (2016.01)
*G06F 3/041* (2006.01)
*G06F 3/044* (2006.01)
*G09G 3/20* (2006.01)

(52) U.S. Cl.
CPC ........ *G06F 3/0412* (2013.01); *G06F 3/04164* (2019.05); *G06F 3/0443* (2019.05); *G06F 3/0446* (2019.05); *G09G 3/2007* (2013.01); *G09G 3/3233* (2013.01); *G09G 2300/0842* (2013.01); *G09G 2310/08* (2013.01)

(58) Field of Classification Search
CPC .. G06F 3/0412; G06F 3/04164; G06F 3/0443; G06F 3/0446; G09G 3/2007; G09G 3/3233; G09G 2300/0842; G09G 2310/08
See application file for complete search history.

(56) References Cited

U.S. PATENT DOCUMENTS

| | | | |
|---|---|---|---|
| 10,180,757 B2 | 1/2019 | Kang et al. | |
| 10,268,326 B2 | 4/2019 | Kobayashi | |
| 10,474,281 B2 | 11/2019 | Park et al. | |
| 10,705,654 B2 | 7/2020 | Kim et al. | |
| 2011/0216033 A1* | 9/2011 | Mamba | G06F 3/0446 345/174 |
| 2015/0062080 A1* | 3/2015 | Kang | G06F 3/0446 345/174 |
| 2018/0046325 A1* | 2/2018 | Kim | G06F 3/0412 |

(Continued)

FOREIGN PATENT DOCUMENTS

KR 10-2019-0079166 A 7/2019

*Primary Examiner* — Jeff Piziali
(74) *Attorney, Agent, or Firm* — Sughrue Mion, PLLC

(57) ABSTRACT

A touch display device, including a display panel including: a plurality of source lines configured to provide a plurality of source signals to a plurality of pixels, and a common electrode coupled to the plurality of source lines; a plurality of touch electrodes coupled to the common electrode, and configured to provide a plurality of touch signals according to a plurality of touch driving signals received from the common electrode; and a touch driving circuit configured to generate a plurality of pieces of touch information based on a difference between the plurality of touch signals and each of the plurality of touch driving signals.

14 Claims, 13 Drawing Sheets

(56) References Cited

U.S. PATENT DOCUMENTS

| | | |
|---|---|---|
| 2019/0042055 A1 | 2/2019 | Hu et al. |
| 2019/0102017 A1* | 4/2019 | Kim .................... G06F 3/0412 |
| 2020/0026383 A1* | 1/2020 | Hwang ............... G06F 3/04184 |
| 2022/0011895 A1 | 1/2022 | Park et al. |
| 2022/0187943 A1* | 6/2022 | Lee .................... G06F 3/04184 |
| 2022/0335910 A1* | 10/2022 | Bhat .................. G06F 3/03545 |

* cited by examiner

FIG. 10

| | | | | | | | | | | | | | |
|---|---|---|---|---|---|---|---|---|---|---|---|---|---|
| CRL_1 | CRL_2 | CRL_3 | ... | CRL_a | CRL_a+1 | ... | CRL_b | CRL_b+1 | ... | CRL_k | ... | CRL_m | |
| CR2_1 | CR2_2 | CR2_3 | | | | | ... | | | | | CR2_m | |
| CR3_1 | CR3_2 | CR3_3 | | | | | ... | | | | | CR3_m | |
| ... | ... | ... | | | | | ... | | | | | ... | |

Hsync_1st
Hsync_2nd
Hsync_3rd

TOUCH DISPLAY DEVICE

CROSS-REFERENCE TO RELATED APPLICATION

This application is based on and claims priority under 35 U.S.C. § 119 to Korean Patent Application No. 10-2022-0176214, filed in the Korean Intellectual Property Office on Dec. 15, 2022, the disclosure of which is incorporated by reference herein in its entirety.

BACKGROUND

1. Technical Field

The present disclosure relates to a touch display device.

2. Description of Related Art

A touch display device may include a display panel and a touch panel for touch sensing. The display panel and the touch panel may be vertically stacked, and parasitic capacitance between electrodes of the two panels may increase as a distance between the display panel and the touch panel increases. The parasitic capacitance may cause noise during touch sensing or display. Noise may affect a touch signal provided from a touch panel, thereby deteriorating touch sensing sensitivity. In addition, noise may affect a data signal provided to a display panel, thereby deteriorating quality of an image displayed on the display panel.

SUMMARY

Provided is a touch display device capable of preventing image quality deterioration due to driving of a touch panel and being driven with low power.

Additional aspects will be set forth in part in the description which follows and, in part, will be apparent from the description, or may be learned by practice of the presented embodiments.

In accordance with an aspect of the disclosure, a touch display device includes a display panel including: a plurality of source lines configured to provide a plurality of source signals to a plurality of pixels, and a common electrode coupled to the plurality of source lines; a plurality of touch electrodes coupled to the common electrode, and configured to provide a plurality of touch signals according to a plurality of touch driving signals received from the common electrode; and a touch driving circuit configured to generate a plurality of pieces of touch information based on a difference between the plurality of touch signals and each of the plurality of touch driving signals.

In accordance with an aspect of the disclosure, a touch display device includes a plurality of pixels; a plurality of source lines connected to the plurality of pixels and configured to receive a plurality of source signals; a common electrode configured to supply a driving voltage to the plurality of pixels; a plurality of first capacitors between the plurality of source lines and the common electrode; and a plurality of touch electrodes coupled to the common electrode through a plurality of second capacitors, wherein the plurality of source lines are further configured to provide the plurality of source signals to the common electrode through the plurality of first capacitors as a plurality of touch driving signals, and wherein touch electrodes are further configured to receive the plurality of touch driving signals through the plurality of second capacitors.

In accordance with an aspect of the disclosure, a touch display device includes a plurality of source lines; a common electrode coupled to the plurality of source lines; a touch electrode coupled to the common electrode and configured to receive a plurality of source signals from the plurality of source lines as a touch driving signal through the common electrode; and a touch driving circuit configured to generate touch information by correcting a touch signal received from the touch electrode based on gray information corresponding to the plurality of source signals.

BRIEF DESCRIPTION OF DRAWINGS

The above and other aspects, features, and advantages of certain embodiments of the present disclosure will be more apparent from the following description taken in conjunction with the accompanying drawings, in which;

FIG. 10 illustrates a block diagram showing gray information of one frame received by a touch processor according to an embodiment;

DETAILED DESCRIPTION OF EMBODIMENTS

Figure 1:
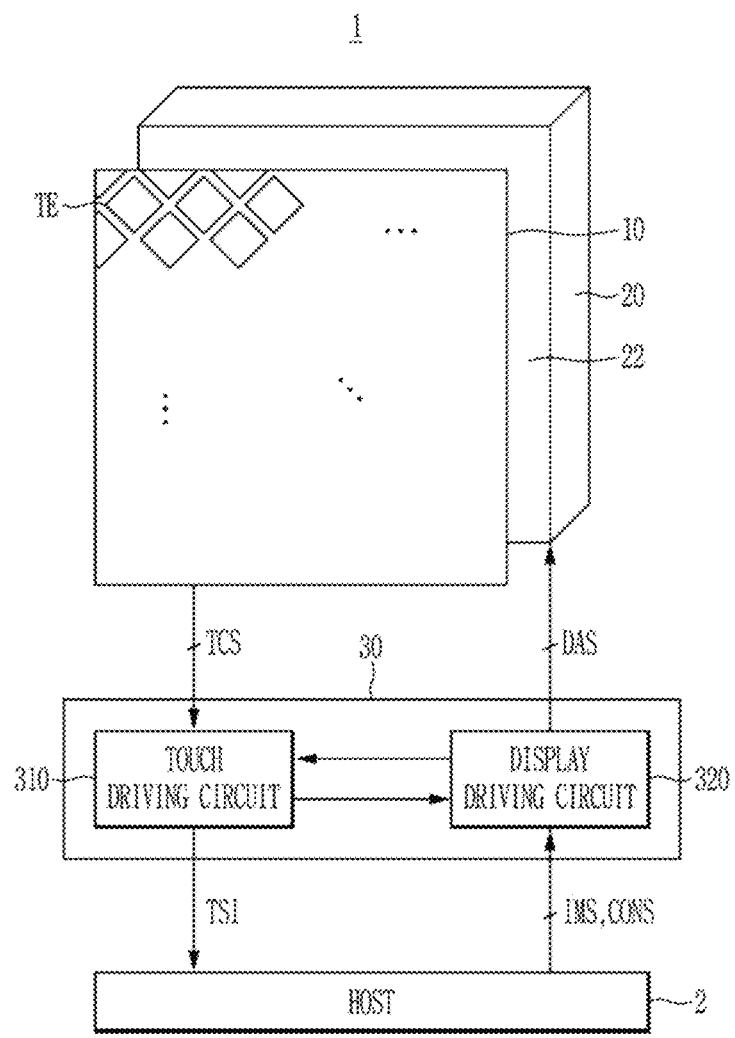
FIG. 1 illustrates a block diagram showing a touch display device according to an embodiment.

In the following detailed description, embodiments of are shown and described by way of illustration. As those skilled in the art would realize, the described embodiments may be modified in various different ways, all without departing from the spirit or scope of the disclosure.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

In the following disclosure, 'capacitance' may refer to capacitance electrically generated according to disposition of two or more conductive elements, and may include parasitic capacitance.

FIG. 1 illustrates a block diagram showing a touch display device according to an embodiment.

As illustrated in FIG. 1, the touch display device 1 may include a touch panel 10, a display panel 20, and a driving circuit 30.

The touch panel 10 may generate a touch signal that changes according to an external touch, and the display panel 20 may display an image according to a source signal DAS supplied from the driving circuit 30. The display panel 20 may include a common electrode 22. The common electrode 22 according to an embodiment may be an electrode to which a common voltage is supplied. The driving circuit 30 may include a touch driving circuit 310 and a display driving circuit 320. In embodiments, one or more of the driving circuit 30, the touch driving circuit 310 and the display driving circuit 320 may be, or may be included in, a display driver integrated circuit (DDI).

The display driving circuit 320 may receive an image signal IMS and a control signal CONS from the host 2. The image signal IMS may be a signal representing an image to be displayed on the display panel 20, and the control signal CONS may include a vertical synchronizing signal, a horizontal synchronizing signal, a data enable signal, a main clock signal, and the like used by the display driving circuit 320 to display the image signal IMS. The host 2 may include a graphics processing unit (GPU), a visual processing unit (VPU), etc., capable of converting an image source into an image signal suitable for the display panel 20.

The display panel 20 may be implemented as one of a liquid crystal display (LCD), a light emitting diode (LED) display, an organic LED (OLED) display, and an active-matrix OLED (AMOLED) display, and may be implemented as another type of flat panel or flexible panel.

The touch driving circuit 310 may generate touch sensing information TSI, which may indicate whether or not a touch is input, touch coordinates at which a touch has occurred, touch pressure, and the like based on a plurality of touch signals TCS, and may provide the touch sensing information TSI to the host 2. The host 2 may analyze a touch position, touch duration, and touch intensity based on the touch sensing information TSI, and may perform a control operation according to an analysis result. The host 2 may include an application processor, and commands for performing the above touch analysis operation and a control operation according to the analysis result may be generated by the application processor.

The touch may include direct contact of a conductive object (e.g., a user finger, a palm, a touch pen, a stylus pen, etc.) on the touch panel 10 as well as proximity of the conductive object to the touch panel 100. The touch panel 10 may be stacked on the display panel 20, and may be attached to one surface of the display panel 20 on which an image is displayed.

The touch panel 10 may include a plurality of touch electrodes TE disposed in a matrix form. The touch signals TCS may be provided to the touch driving circuit 310 through the touch electrodes TE. A shape and arrangement of the touch electrodes TE illustrated in FIG. 1 are examples, and embodiments are not limited thereto.

In an embodiment, the touch electrodes TE may generate mutual capacitance with an electrode, which may be referred to as a common electrode, disposed on the display panel 20. The touch panel 10 may operate according to a capacitance sensing method using mutual capacitance. A capacitance between each of the touch electrodes and the common electrode may change according to a touch, and a voltage of each touch electrode may change due to the capacitance change. The touch signals TCS may be signals which depend on, or which are generated based on, voltages generated in the touch electrodes TE according to a touch driving signal supplied to the touch electrodes TE.

The display panel 20 may include a plurality of gate lines, a plurality of source lines, and a plurality of pixels disposed in a matrix form at a point where the gate lines and the source lines intersect. The display driving circuit 320 may supply a plurality of source signals DAS to the source lines in the display panel 20, may generate a plurality of scan signals having an on-level according to a scan order to supply them to the gate lines, and may program the source signals DAS to the pixels according to a scan order.

Although the touch panel 10 and the display panel 20 are illustrated as being separate in FIG. 1, embodiments not limited thereto. For example, some embodiments may include at least one of an in-cell structure in which the touch electrodes of the touch panel 10 are coupled to a layer including or included in a pixel of the display panel 20, and an on-cell structure in which the touch electrodes of the touch panel 10 are coupled to an upper portion of the display panel 20.

The touch driving circuit 310 may receive the touch signals TCS from the touch electrodes TE of the touch panel 10, and may detect a touch by using a touch signal having a change in voltage compared to a predetermined reference voltage from among the received touch signals. The reference voltage may be a voltage provided to the touch electrodes TE according to a touch driving signal supplied through the common electrode 22. The source signals DAS may be supplied to a plurality of source lines according to a scan order for the display panel 20, and may be supplied as a plurality of touch driving signals for the touch electrodes TE through the common electrode 22. The touch driving circuit 310 may obtain the touch signals TCS from the touch electrodes TE, and information related to touch input, touch coordinates, touch pressure, etc. on the touch panel 10 may be generated and provided to the host 2 according to the touch signals TCS. According to an embodiment, a touch driving signal for the touch electrodes TE m the touch panel 10 may be provided from the common electrode 22.

A touch display device according to an embodiment will now be described with reference to FIG. 2.

Figure 2:
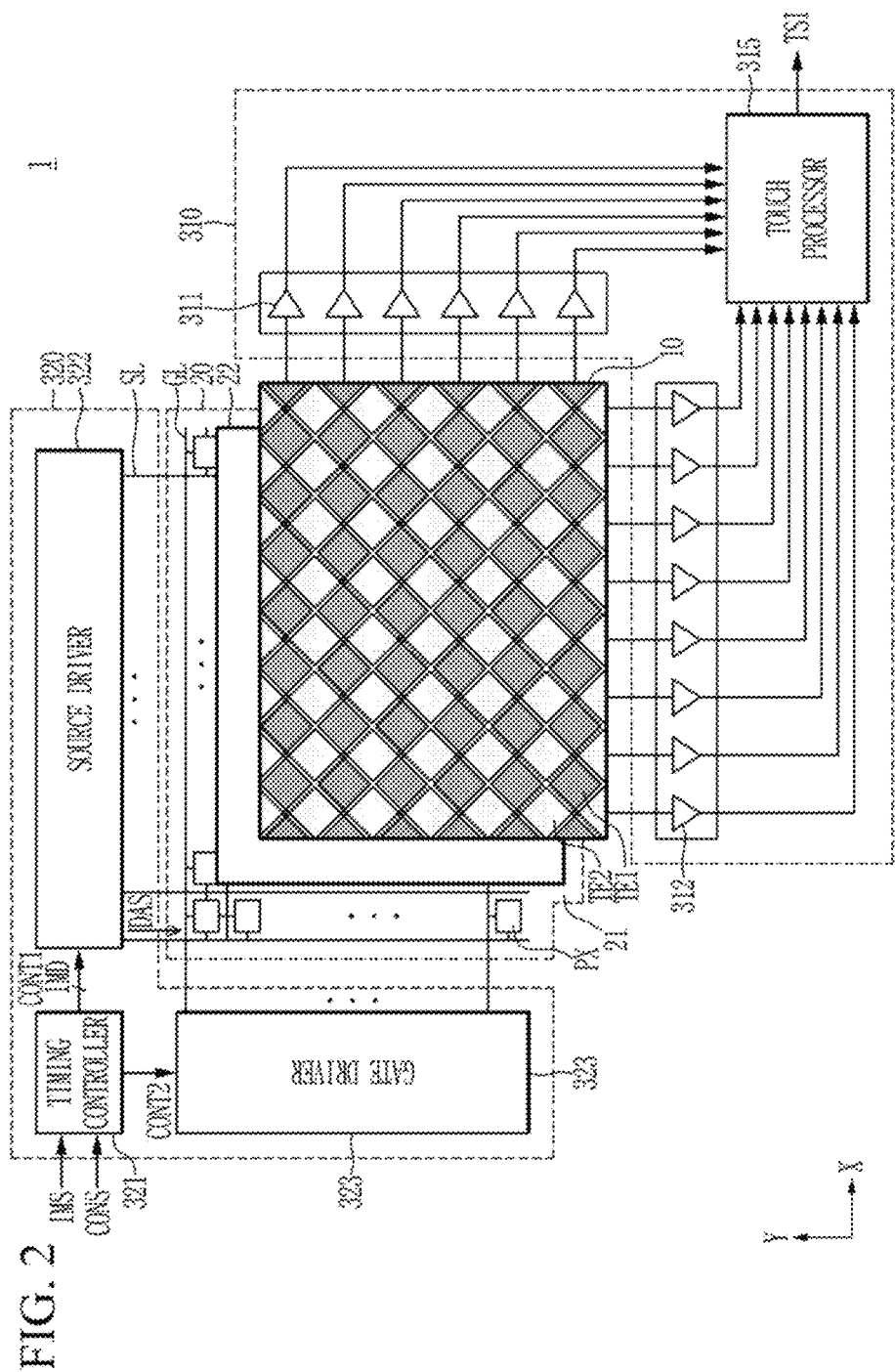
FIG. 2 illustrates a block diagram of a touch display device according to an embodiment.

FIG. 2 illustrates a block diagram of a touch display device according to an embodiment.

In FIG. 2, the touch panel 10, the display panel 20, the touch driving circuit 310, and the display driving circuit 320 included in the touch display device 1 are illustrated in more detail than in FIG. 1.

As illustrated in FIG. 2, the touch panel 10 may include a plurality of touch electrodes TE1 and TE2. The touch electrodes TE1 and TE2 may operate as electrodes for sensing a touch input. The touch electrodes TE1 may be connected in a first direction, e.g., an X-axis direction, and the touch electrodes TE2 may be connected in a second direction, e.g., a Y-axis direction. The first direction and the second direction may be directions orthogonal to each other Mutual capacitance may be generated between each of the touch electrodes TE1 and TE2 and the common electrode 22. In FIG. 2, the touch electrodes TE1 and TE2 are illustrated to have a diamond shape, but embodiments are not limited thereto. The shape of the touch electrodes TE1 and TE2 may be implemented in various patterns having a predetermined size to enable touch sensing.

The touch driving circuit 310 may include a plurality of first receiving circuits 311, a plurality of second receiving circuits 312, and a touch processor 315.

The first receiving circuits 311 may receive a plurality of touch signals from the touch electrodes TE1. The second receiving circuits 312 may receive a plurality of touch signals from the touch electrodes TE2. Mutual capacitance of a touch electrode corresponding to a touch position in the touch electrodes TE1 and TE2 may decrease, and a voltage level of a touch signal may decrease. The first receiving circuits 311 and the second receiving circuits 312 may amplify the touch signals to transmit the amplified touch signals to the touch processor 315.

The touch processor 315 may detect a touch according to the touch signals received from the first receiving circuits 311 and the second receiving circuits 312. The touch processor 315 may generate touch sensing information TSI based on the touch signals.

The display panel 20 may include a display layer 21 and a common electrode 22, the display layer 21 may include a substrate of the display panel 20, a semiconductor layer and an electrode layer disposed on the substrate, and an emission layer disposed on the semiconductor layer and the electrode layer. The common electrode 22 may be disposed above the display layer 21 based on a direction in which an image is displayed on the display layer 21. In FIG. 2, a plurality of gate lines GL extending in the first direction (e.g., the X-axis direction) of the display layer 21 and a plurality of source lines SL extending in the second direction (e.g., the Y-axis direction) are illustrated. Each of a plurality of pixels may be positioned in an area at which the source lines SL and the gate lines GL intersect. A power voltage used to operate the pixels PX may be supplied to the common electrode 22.

Figure 3:
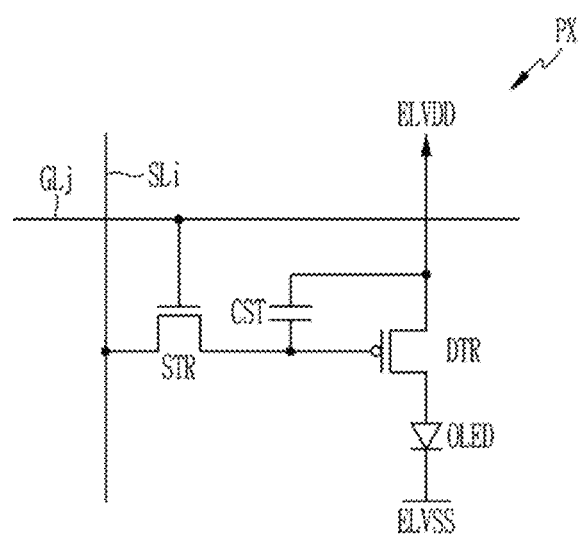
FIG. 3 illustrates a circuit diagram showing a pixel according to an embodiment.

FIG. 3 illustrates a circuit diagram showing a pixel according to an embodiment.

As illustrated in FIG. 3, the pixel PX may include a switching transistor STR, a driving transistor DTR, a storage capacitor CST, and an organic light emitting diode OLED. The pixel PX may be connected to one source line SLi (where i is a natural number) from among the source lines SL and one gate line GLj (wherein j is a natural number) from among the gate lines GL.

The switching transistor STR may be turned on by a gate signal having an on-level supplied through the gate line GLj, a source signal supplied through the source line SLi may be supplied to a gate of the driving transistor DTR, the storage capacitor CST may maintain a gate voltage of the driving transistor DTR, and the driving transistor DTR may supply a driving current according to a voltage difference between a driving voltage ELVDD supplied to the source and a source signal supplied to the gate, to the organic light emitting diode OLED. In order for the organic light emitting diode OLED to emit light according to a driving current, a driving voltage ELVSS may be supplied to a cathode of the organic light emitting diode OLED. The driving voltage ELVSS according to an embodiment may be supplied to the pixels PX through the common electrode 22.

FIG. 3 illustrates a pixel including an organic light emitting diode, which is one of various types of pixels. However, embodiments are not limited thereto, and embodiments may be applied to a display device including one of various pixels supplying a voltage used to drive the pixel through the common electrode 22.

The display driving circuit 320 may include a timing controller 321, a source driver 322, and a gate driver 323.

The timing controller 321 may receive an image signal IMS and a control signal CONS from the host device 2, may process the image signal to generate an image data signal IMD, and may provide the image data signal IMD to the source driver 322. The timing controller 321 may generate timing control signals for controlling operation timings of the source driver 322 and the gate driver 323 based on the control signal CONS. The timing control signals may include a gate timing control signal CONT1 for controlling an operation timing of the gate driver 323 and a source timing control signal CONT2 for controlling an operation timing of the source driver 322.

The source driver 322 may process the image data signal IMD according to the source timing control signal CONT2 to generate the source signals DAS, and may supply the source signals DAS to the source lines SL. The source timing control signal CONT2 may include a latch signal controlling latch timing of the source driver 322, at least two clock signals synchronized with each of a horizontal period and a vertical period, and the like. Each of the source signals DAS may be an analog voltage.

The gate driver 323 may supply a plurality of gate signals having on pulses according to the gate timing control signal CONT1 to the gate lines sequentially or non-sequentially. The switching transistors STR of the pixels PX connected to the corresponding gate line GL may be turned on according to an on-level pulse of the gate signal so that the source signals DAS supplied through the source lines SL may be written in the pixels.

The timing by which the source driver 322 supplies the source signals DAS to the source lines SL and the timing by which the gate driver 323 supplies a gate signal having an on-level to each of the gate lines GL may be synchronized with each other.

Figure 4:
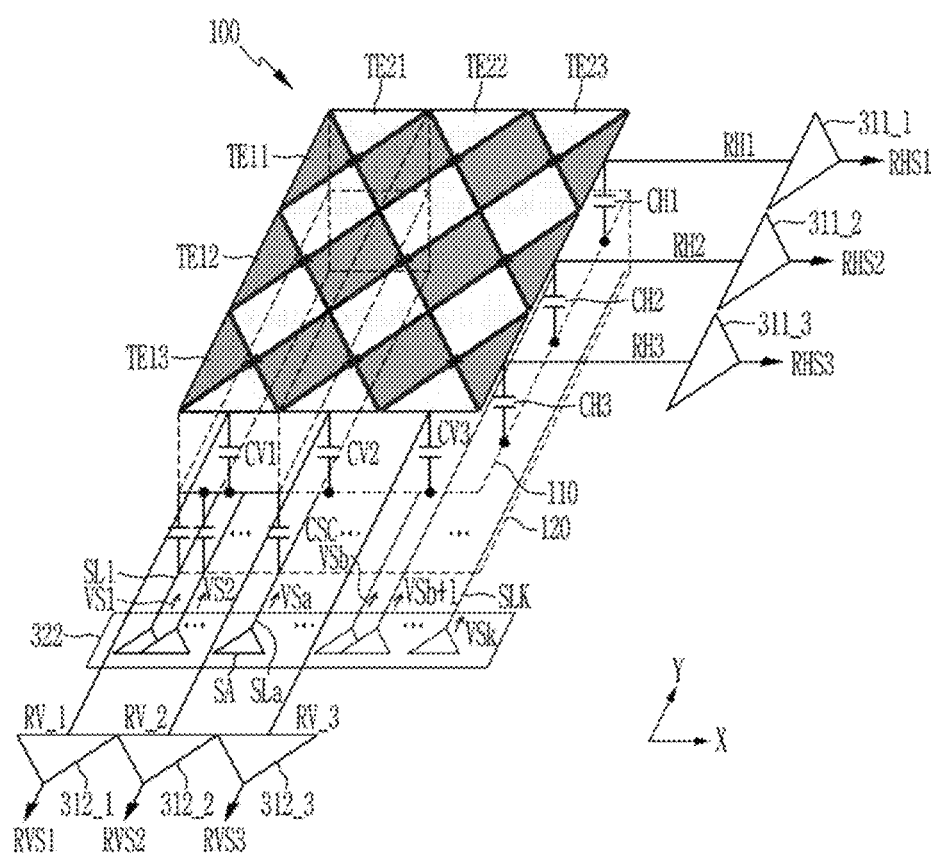
FIG. 4 illustrates a circuit diagram showing components related to driving for touch sensing in some areas of a touch display device according to an embodiment.

FIG. 4 illustrates a circuit diagram showing components related to driving for touch sensing in some areas of a touch display device according to an embodiment.

In FIG. 4, some elements of the touch display device 1 are illustrated for convenience of description. For example, the region illustrated in FIG. 4 in which three touch electrodes TE11, TE12, and TE13 connected in the X-axis direction and a plurality of touch electrodes TE21, TE22, and TE23 connected in the Y-axis direction are positioned, may be included in the touch panel 10 illustrated in FIG. 2. In embodiments, this region may be referred to as a touch panel 100. In the display panel 20 illustrated in FIG. 2, a portion of the common electrode 22 corresponding to the touch panel 100 may be referred to as a common electrode 110, and a portion of the display layer 21 corresponding to the touch panel 100 may be referred to as a display layer 120.

The touch electrode TE11 may be connected to a corresponding first receiving circuit 311_1 from among the first receiving circuits 311, the touch electrode TE12 may be connected to a corresponding first receiving circuit 311_2 from among the first receiving circuits 311, and the touch electrode TE13 may be connected to a corresponding first receiving circuit 3113 from among the first receiving circuits 311. The touch electrode TE21 may be connected to a corresponding second receiving circuit 312_1 from among the second receiving circuits 312, the touch electrode TE22 may be connected to a corresponding second receiving circuit 312_2 from among the second receiving circuits 312, and the touch electrode TE23 may be connected to a corresponding second receiving circuit 312_3 of the second receiving circuits 312.

FIG. 4 illustrates a plurality of amplifiers SA supplying a plurality of source signals to a plurality of source lines in the source driver 322. Each of the amplifiers SA may be connected to a corresponding source line.

The source lines SL and the common electrode 110 may be coupled through a plurality of capacitors CSC. In FIG. 4, the capacitors CSC formed between the source lines SL and the common electrode 110 are illustrated as an equivalent circuit. The common electrode 110 and a plurality of touch electrodes TE11 to TE13 and TE21 to TE23 may also be coupled through a plurality of capacitors CH1 to CH3 and CV1 to CV3. In FIG. 4, the capacitors CH1 to CH3 and CV1 to CV3 formed between the touch electrodes TE11 to TE13 and TE21 to TE23 and the common electrode 110 are illustrated as an equivalent circuit. In FIG. 4, in order to show the coupling between two components, each of a plurality of capacitors is illustrated formed at a specific position, but embodiments are not limited thereto, and the capacitors formed between two actually coupled components may be different from that of FIG. 4.

Because the source lines SL and the common electrode 110 may be coupled through the capacitors CSC, a voltage of the common electrode 110 may vary according to a plurality of source signals VS1 to VSk supplied to the source lines SL. Although the common electrode 110 is illustrated as one surface in FIG. 2 and FIG. 4, the common electrode 110 may be implemented as an electrode structure having a resistance component. For example, even when the common electrode 110 is a single-sided electrode, a sheet resistance component exists in the common electrode 110, and even when the common electrode 110 is implemented as a plurality of electrodes connected to each other, a resistance component may exist in the common electrode 110. As such, the common electrode 110 may be electrically divided into a plurality of nodes by the resistance component of the common electrode 110, and because a plurality of corresponding source signals may be changed according to a position of each node, a voltage of each node may be changed. Hereinafter, a node electrically positioned on the common electrode 110 may be referred to as a "common node", and a voltage of the common node may be referred to as a "common node voltage". A plurality of common node voltages of the common electrode 110 may change according to a plurality of source signals during every horizontal period through coupling between the source lines SL and the common electrode 110.

Figure 5:
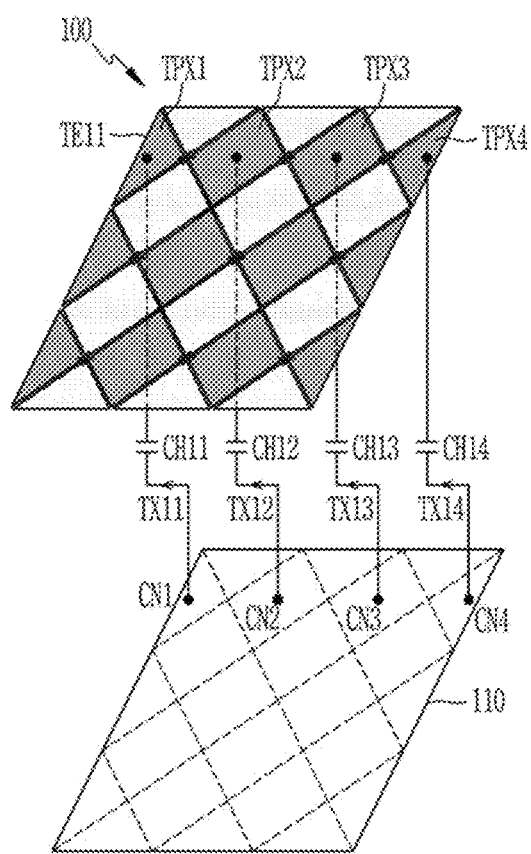
FIG. 5 illustrates a view for describing a touch driving signal supplied to a plurality of touch electrodes extending in a first direction according to an embodiment.

FIG. 5 illustrates a view for describing a touch driving signal supplied to a plurality of touch electrodes extending in a first direction according to an embodiment.

As illustrated in FIG. 5, the touch electrode TE11 may include four touch pixels TPX1 to TPX4, and common nodes CN1 to CN4 corresponding to the respective four touch pixels TPX1 to TPX4 may be defined in the common electrode 110. The common nodes CN1 to CN4 may be arbitrary areas of the common electrode 110 defined for describing the touch driving signal, and may be examples of areas that can be coupled to touch pixels through capacitors. In FIG. 5, four capacitors CH11 to CH14 may be formed between the respective four touch pixels TPX1 to TPX4 and the respective four common nodes CN1 to CN4 corresponding thereto. Although FIG. 5 schematically illustrates capacitors between a touch electrode and a common electrode, embodiments are not limited thereto.

Figure 6:
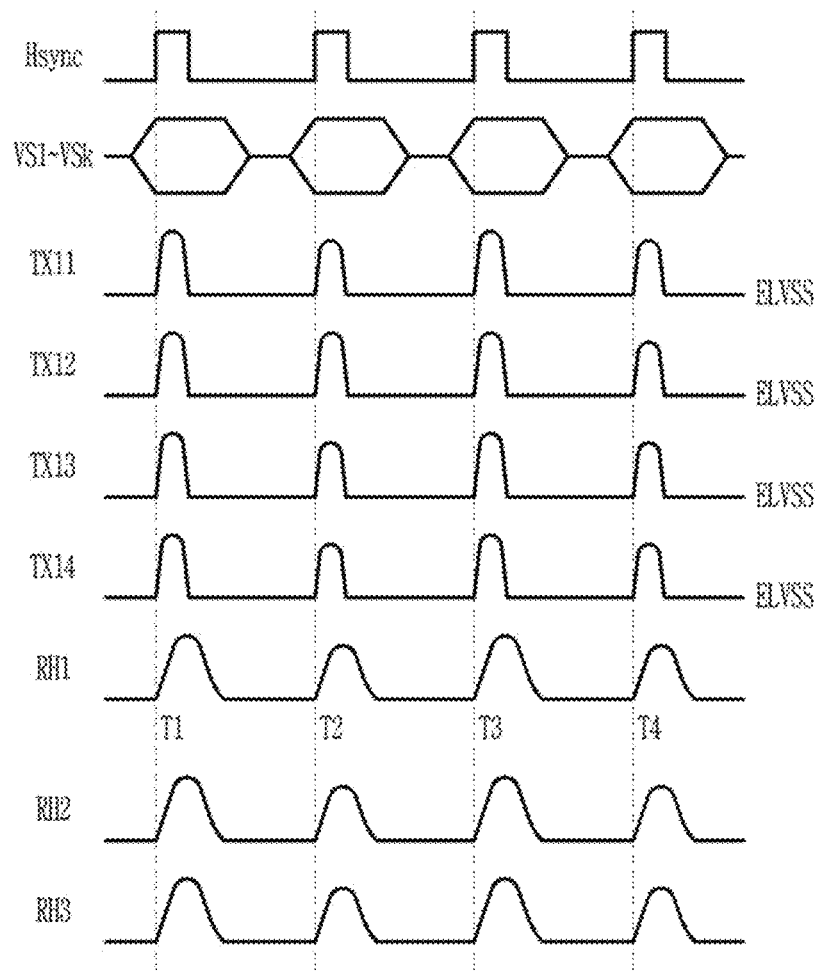
FIG. 6 illustrates a waveform diagram for describing a touch signal depending on a source signal according to an embodiment.

FIG. 6 illustrates a waveform diagram for describing a touch signal depending on a source signal according to an embodiment.

In FIG. 6, a plurality of source signals VS1 to VSk are supplied to a plurality of source lines during every horizontal period. The source lines SL1 to SLk illustrated in FIG. 4 may correspond to the touch electrodes TE11 in the display panel 120, and the source signals VS1 to VSk may be supplied to the respective source lines SL1 to SLk.

The source signals VS1 to VSk may be supplied to a plurality of source lines SL1 to SLk during every horizontal period, and touch driving signals TX11, TX12, TX13, and TX14 may be generated in the respective common nodes CN1, CN2, CN3, and CN4 according to a plurality of source signals supplied to a plurality of source lines coupled to the common nodes CN1, CN2, CN3, and CN4, respectively.

For example, at a time T1, a plurality of first source signals supplied to the plurality of first source lines corresponding to the common node CN1 may be filtered through a plurality of capacitors formed between the common node CN1 and the first source lines to be supplied as the touch driving signal TX11 to the common node CN1. In this case, the first source lines may be source lines coupled to the common node CN1 through capacitors from among the source lines SL1 to Slk, the first source signals may be source signals supplied to corresponding partial source lines, and the first source signals may be low-pass filtered by the capacitors CSC between the first source lines and the common electrode 110 to be supplied to the common node CN1 as the touch driving signal TX11. As illustrated in FIG. 6, the touch driving signal TX11 may be a waveform obtained by low-pass filtering and averaging the first source signals based on the ELVSS voltage. In the same manner, at the time T1, a plurality of second source signals, a plurality of third source signals, and a plurality of fourth source signals supplied to a plurality of second source lines, a plurality of third source lines, and a plurality of fourth source lines corresponding to the common node CN2, the common node CN3, and the common node CN4 may be respectively filtered to be supplied as touch driving signals TX12, TX13, and TX14 to the common node CN2, CN3, and CN4. The waveforms illustrated in FIG. 6 are examples, and embodiments are not limited thereto.

Touch driving signals TX11 to TX14 may be respectively supplied to the touch pixels TPX1 to TPX4 through a plurality of capacitors CH11 to CH14. Because the touch pixels TPX1 to TPX4 may be electrically connected to form one touch electrode TE11, the touch driving signals TX11 to TX14 supplied to each touch pixel may be filtered by the capacitors CH11 to CH14 to be generated as one touch signal RH1 in the touch electrode TE11. A touch signal RH1 may be supplied to a first receiving circuit 311_1. The touch electrode TE11 and the common electrode 110 may be coupled through the capacitors CH11 to CH14, and a resistance component may exist in an electrical connection between the first receiving circuit 311_1 and the touch electrode TE11. Accordingly, the touch driving signals TX11 to TX14 may pass through a low pass filter implemented by combining the capacitors CH11 to CH14 between the touch electrode TE11 and the common electrode 110 and a resistance component between the touch electrode TE11 and the first receiving circuit 311_1 to be converted into one touch signal RH1, and the touch signal RH1 may be supplied to the first receiving circuit 311_1. In this case, the touch signal RH1 may be based on an average of the touch driving signals TX11 to TX14. Each of the touch driving signals TX11 to TX14, which may be voltages according to the corresponding source signals VS1 to VSk, may be determined according to a signal obtained by low-pass filtering the corresponding source signals VS1 to VSk, for example, and the touch signal RH1 may be determined according to a signal depending on the touch driving signals TX11 to TX14, for example a signal obtained by low-pass filtering the touch driving signals TX11 to TX14 Therefore, the touch signal RH1 may be implemented as a signal according to the source signals VS1 to VSk provided to the source lines SL1 to SLk coupled to the touch electrode TE11 through a capacitor, for example a signal obtained by low-pass filtering the source signals VS1 to VSk. Hereinafter, a plurality of source signals supplied to a plurality of source lines coupled to a certain touch electrode through capacitors may be referred to as "a plurality of source signals corresponding to a touch electrode" or "a plurality of source signals corresponding to a touch signal of the touch electrode".

In the same manner as described with reference to the waveform at the time T1, the touch signal RH1 according to a plurality of source signals corresponding to the touch electrode TE11 may be supplied to the first receiving circuit 311_1 every horizontal period T2, T3, and T4. For reference, the waveform of the touch signal RH1 illustrated in FIG. 6 may be a waveform when there is no touch on the touch electrode TE11.

Embodiments corresponding to FIG. 5 and FIG. 6 may be applied to the touch electrodes extending in the X-axis direction in the touch panel 100. Accordingly, touch signals RH2 and RH3 of the respective touch electrodes TE12 and TE13 may also be generated in the same manner as the method of generating the touch signal RH1 described above, as illustrated in FIG. 6. Because source signals corresponding to the respective touch electrodes TE11, TE12, and TE12 may be substantially the same, the touch signals RH1, RH2, and RH3 may have substantially the same waveform.

Because the touch electrodes TE11, TE12, and TE12 may extend in the X-axis direction, a plurality of source lines coupled to the respective touch electrodes through capacitors may be the same. For example, a plurality of source signals corresponding to the respective touch electrodes may be the same. In contrast, a plurality of touch electrodes TE21, TE22, and TE23 may extend in the Y-axis direction, and a plurality of source signals corresponding to the respective touch electrodes TE21, TE22, and TE23 may be different. An area for each of the touch electrodes TE21, TE22, and TE23 may be referred to as a touch column unit, and the source signals corresponding to the respective touch electrodes TE21, TE22, and TE23 may be referred to as source signals in units of touch columns.

Figure 7:
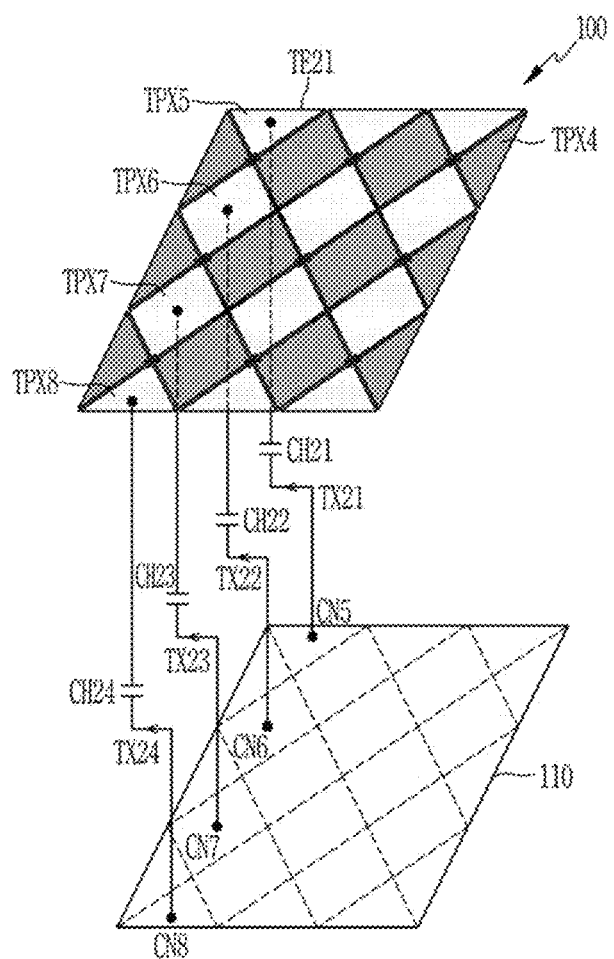
FIG. 7 illustrates a view for describing a touch driving signal supplied to a plurality of touch electrodes extending in a second direction according to an embodiment.

FIG. 7 illustrates a view for describing a touch driving signal supplied to a plurality of touch electrodes extending in a second direction according to an embodiment.

As illustrated in FIG. 7, the touch electrode TE21 may include four touch pixels TPX5 to TPX8, and common nodes CN5 to CN8 corresponding to the respective four touch pixels TPX5 to TPX8 may be defined in the common electrode 110. The common nodes CN5 to CN8 may be arbitrary areas of the common electrode 110 defined for describing the touch driving signal, and may be examples of areas that can be coupled to touch pixels through capacitors. For convenience of description, in FIG. 7, four capacitors CH21 to CH24 may be formed between the respective four touch pixels TPX5 to TPX8 and the respective four common nodes CN5 to CN8 corresponding thereto. Although FIG. 7 schematically illustrates a capacitor between a touch electrode and a common electrode for describing an embodiment, embodiments are not limited thereto.

Figure 8:
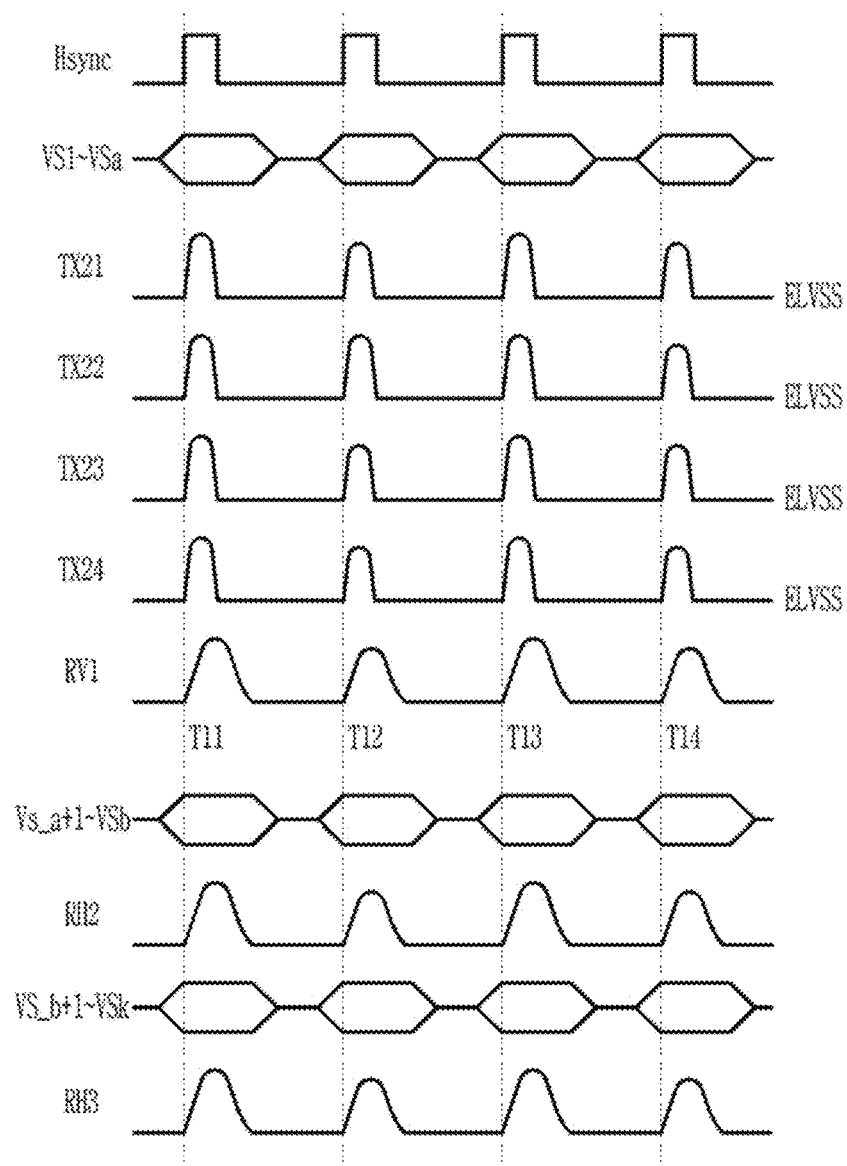
FIG. 8 illustrates a waveform diagram for describing a touch signal depending on a plurality of source signals according to an embodiment.

FIG. 8 illustrates a waveform diagram for describing a touch signal depending on a plurality of source signals according to an embodiment.

In FIG. 8, a plurality of source signals VS1 to VSk may be supplied to a plurality of source lines SL1 to SLk during every horizontal period. A plurality of source lines SL1 to SLa from among the source lines SL1 to SLk illustrated in FIG. 4 may correspond to the touch electrodes TE21 in the display panel 120, and the source signals VS1 to VSa may be supplied to the respective source lines SL1 to SLa. The source lines SL1 to SLa are examples of some source lines that are coupled to the touch electrode TE21 through the common nodes CN5, CN6, CN7, and CN8 from among the source lines SL1 to Slk, and the source lines corresponding to the touch electrode TE21 are not limited thereto.

The source signals VS1 to VSa may be supplied to a plurality of source lines SL1 to SLk during every horizontal period, and touch driving signals TX21, TX22, TX23, and TX24 may be generated according to a plurality of source signals supplied to a plurality of source lines coupled to the respective common nodes CN5, CN6, CN7, and CN8.

For example, at a time T11, the source signals VS1 to VSa supplied to the source lines SL1 to SLa corresponding to the common node CN5 may be low-pass filtered by the capacitor CSC between the source lines SL1 to SLa and the common electrode 110, to be supplied as the touch driving signal TX21 to the common node CN5. As illustrated in FIG. 8, the touch driving signal TX21 may be a waveform obtained by low-pass filtering and averaging the source signals VS1 to VSa based on the ELVSS voltage. In the same manner, at the time T11, the source signals VS1 to VSa may be filtered at each of the common node CN6, the common node CN7, and the common node CN8 to supply touch driving signals TX22, TX23, and TX24. The waveforms illustrated in FIG. 8 are examples, and embodiments are not limited thereto.

Touch driving signals TX21 to TX24 may be respectively supplied to the touch pixels TPX5 to TPX8 through a plurality of capacitors CH21 to CH24. Because the touch pixels TPX5 to TPX8 may be electrically connected to form one touch electrode TE21, the touch driving signals TX21 to TX24 supplied to each touch pixel may be filtered by the capacitors CH21 to CH24 to be generated as one touch signal RV1 to the second receiving circuit 312_1. For example, a plurality of capacitors CH21 to CH24 may be formed between the touch electrode TE21 and the common electrode 110, and a resistance component may exist in an electrical connection between the second receiving circuit 312_1 and the touch electrode TE21. Accordingly, the touch driving signals TX21 to TX24 may pass through a low pass filter implemented by combining the capacitors CH11 to CH14 between the touch electrode TE21 and the common electrode 110 and a resistance component between the touch electrode TE21 and the second receiving circuit 312_1 to be converted into one touch signal RV1, and the touch signal RV1 may be supplied to the first receiving circuit 312_1. In this case, the touch signal RV1 may be based on an average of the touch driving signals TX21 to TX24. Each of the touch driving signals TX21 to TX24 may be determined according to a signal obtained by low-pass filtering the corresponding source signals VS1 to Vsa, and the touch signal RV1 is determined according to a signal according to the touch driving signals TX21 to TX24, e.g., a signal obtained by low-pass filtering of the touch driving signals TX21 to TX24, and thus the touch signal RV1 may be implemented as a signal according to the source signals VS1 to VSa, e.g., a signal obtained by low-pass filtering the source signals VS1 to VSa.

In the same manner as described with reference to the waveform at the time T11, the touch signal RV1 according to the source signals VS1 to VSa corresponding to the touch electrode TE21 may be supplied to the touch electrode TE11 every horizontal period T12, T13, and T14.

Embodiments corresponding to FIG. 7 and FIG. 8 may be applied to the touch electrodes extending in the X-axis direction in the touch panel 100. Accordingly, touch signals RV2 and RV3 of the respective touch electrodes TE22 and TE23 may also be generated in the same manner as the method of generating the touch signal RV1 described above, as illustrated in FIG. 8. Because source signals corresponding to the respective touch electrodes TE21, TE22, and TE22 are different, the touch signals RV1, RV2, and RV3 may have substantially different waveforms. For example, according to the example shown in FIG. 8, a touch signal RV2 may correspond to a signal obtained by low-pass filtering a plurality of source signals Vs_a+1 to VSb, and a touch signal RV3 may correspond to a signal obtained by low-pass filtering a plurality of source signals VS_b+1 to VSk. The source signals VS_a+1 to VSb may be source signals supplied to a plurality of source lines from an 'a+1'$^{th}$ source line to a 'b'$^{th}$ source line, and the source signals VS_b+1 to VSk may be source signals supplied to a plurality of source lines from a 'b+1'$^{th}$ source line to a 'k'$^{th}$ source line SLk. 'a', 'b', and 'k' may be integers that are greater than or equal to 2, and may satisfy a relationship of a<b<k.

The first receiving circuits 311 may amplify a plurality of touch signals received from the touch electrodes TE1 to transmit them to the touch processor 315, and the second receiving circuits 312 amplify a plurality of touch signals received from the touch electrodes TE2 to transmit them to the touch processor 315. Hereinafter, a touch signal supplied to the touch processor 315 may be referred to as a touch sensing signal in order to distinguish a plurality of touch signals supplied from the touch electrodes TE1 and TE2 to the first receiving circuits 311 and the plurality of second receiving circuits 312, from a signal supplied to the touch processor 315.

Figure 9:
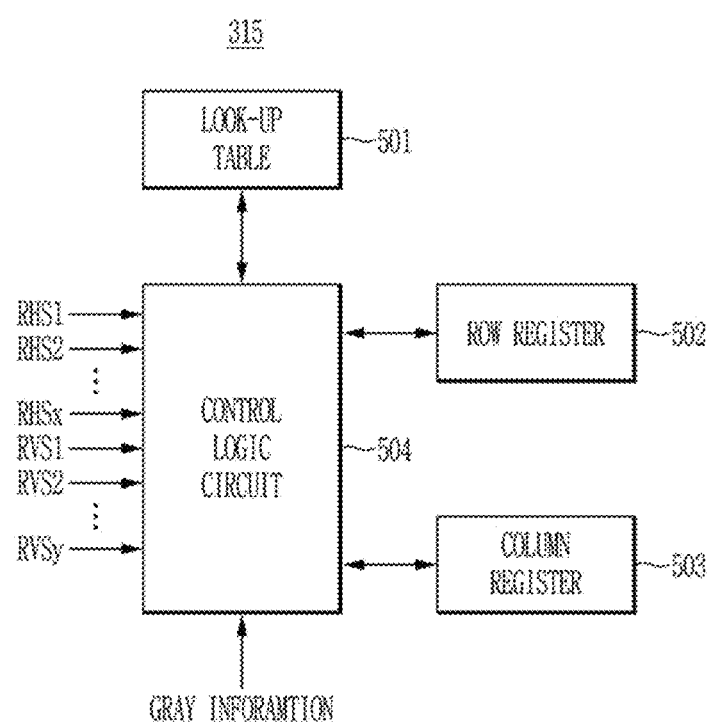
FIG. 9 illustrates a configuration of a touch processor according to an embodiment.

FIG. 9 illustrates a configuration of a touch processor according to an embodiment.

As illustrated in FIG. 9, the touch processor 315 may include a look-up table 501, a row register 502, a column register 503, and a control logic circuit 504.

The touch processor 315 may generate a plurality of pieces of first touch information by using each of a plurality of touch sensing signals, which may be referred to as first touch sensing signals, supplied from the first receiving circuits 311, and a first touch driving signal corresponding to the first touch electrodes TEL. The touch processor 315 may generate a plurality of pieces of second touch information by using each of a plurality of touch sensing signals, which may be referred to as second touch sensing signals, supplied from the second receiving circuits 312, and a plurality of second touch driving signals corresponding to the respective second touch electrodes TE2.

The look-up table 501 may store a level of the first touch driving signal and a level of the second touch driving signal according to gray information. The gray information may include gray data indicating grays or gray levels to be displayed by a plurality of pixels, and the display driving circuit 320 may generate each of a plurality of source signals according to gray data corresponding to a corresponding horizontal period for each horizontal period. The levels of first and second touch driving signals according to the gray information may be obtained by measurement in a manufacturing process of the touch display device 1. For example, when the display panel 20 generates the source signals according to specific gray information to supply them to a plurality of source lines, the first touch electrode TE1 and the second touch electrode TE2 supplied to levels of the touch driving signal may be measured and obtained. In this way, levels of the touch driving signal in all gray ranges provided to the display panel 20 may be measured. The level of the first touch driving signal and the level of the second touch driving signal according to the gray information acquired through the measurement in this way may be recorded in the look-up table 501.

The control logic circuit 504 may divide gray information of one frame in units of horizontal periods, and may derive the level of the first touch driving signal corresponding to the first touch electrodes TE1 from the look-up table 501 based on the gray information during each of horizontal periods. For example, the control logic circuit 504 may determine an average of gray information during each horizontal period as the gray information during the corresponding horizontal period.

The control logic circuit 504 may divide gray information of one frame in units of horizontal periods and touch columns, and may derive the level of the second touch driving signals corresponding to the respective second touch electrodes TE2 from the look-up table 501 based on the gray information in units of touch columns during each horizontal period. For example, the control logic circuit 504 may determine an average of gray information in each of the units of touch columns during each horizontal period as the gray information in a corresponding unit of touch columns during the corresponding horizontal period.

The control logic circuit 504 may divide levels of a plurality of first touch driving signals determined based on the gray information of one frame in units of horizontal periods to record them in the row register 502. The control logic circuit 504 may divide levels of a plurality of second touch driving signals determined based on the gray information of one frame in units of horizontal periods and units of touch columns to record them in the column register 503. The control logic circuit 504 may receive gray information in units of one frame from the timing controller 321 of the display driving circuit 320.

FIG. 10 illustrates a block diagram showing gray information of one frame received by a touch processor according to an embodiment.

The control logic circuit 504 may divide gray information of one frame in units of horizontal periods. For example, a plurality of pieces of gray information GR1_1 to GR1_$m$ may be a plurality of pieces of gray information corresponding to a plurality of source signals supplied through the source lines SL of the display panel 20 during a first horizontal period Hsync_$1^{st}$ of one frame, a plurality of pieces of gray information GR2_1 to GR2_$m$ may be a plurality of pieces of gray information corresponding to a plurality of source signals supplied through the source lines SL of the display panel 20 during a second horizontal period Hsync_$2^{nd}$ of one frame, and a plurality of pieces of gray information GR3_1 to GR3_$m$ may be a plurality of pieces of gray information corresponding to a plurality of source signals provided through the source lines SL of the display panel 20 during a third horizontal period Hsync_$3^{rd}$ of one frame.

The control logic circuit 504 may determine gray information corresponding to the first touch driving signals during each horizontal period based on the pieces of gray information divided in units of horizontal periods. An extension direction of each of the first touch electrodes TE1 may intersect an extension direction of the source lines SL, and thus for each of the first touch electrodes TE1, all of the source lines SL may be coupled through capacitors. Accordingly, all of the gray information in units of horizontal periods may correspond to gray information corresponding to the first touch driving signals.

For example, the control logic circuit 504 may calculate an average of the pieces of gray information GR1_1 to GR1_$m$, and may determine the calculated average as gray information corresponding to the first touch driving signals supplied to the first touch electrodes TE1 during a first horizontal period. The control logic circuit 504 may calculate an average of the pieces of gray information GR2_1 to GR2_$m$ during a second horizontal period, and may determine the calculated average as gray information corresponding to the first touch driving signals supplied to the first touch electrodes TE1 during the second horizontal period. The control logic circuit 504 may calculate an average of the pieces of gray information GR3_1 to Gr3_$m$ during a third horizontal period, and may determine the calculated average as gray information corresponding to the first touch driving signals supplied to the first touch electrodes TE1 during the third horizontal period. The control logic circuit 504 may read the level of the first touch driving signal corresponding to gray information determined in units of horizontal periods in the look-up table 501 to record the read level in the row register 502.

The control logic circuit 504 may divide gray information of one frame in touch units of horizontal periods and touch columns. Each of the second touch electrodes TE2 may extend in a same direction as the source lines SL, and thus the source lines coupled to the respective second touch electrodes through capacitors may vary according to an area where each of second touch electrodes are positioned. Accordingly, the plurality of pieces of gray information in units of horizontal periods and units of touch columns may be reflected as gray information corresponding to each of the second touch driving signals.

The control logic circuit 504 may determine gray information corresponding to each of the second touch driving signals during each horizontal period by dividing the pieces of gray information in units of horizontal periods and touch columns. For example, the control logic circuit 504 may calculate an average of the pieces of gray information GR1_1 to GR1_$a$ among the pieces of gray information GR1_1 to Gr1_$m$, and may determine the calculated average value as gray information corresponding to one of the second touch driving signals, that is, the second touch driving signal supplied to the second touch electrode TE21 during the first horizontal period. The control logic circuit 504 may calculate an average of the pieces of gray information GR1_$a$+1 to GR1_$b$ among the pieces of gray information GR1_1 to GR1_$m$, and may determine the calculated average value as gray information corresponding to another one of the second touch driving signals, that is, the second touch driving signal supplied to the second touch electrode TE22 during the first horizontal period. The control logic circuit 504 may calculate an average of the pieces of gray information GR1_$b$+1 to GR1_$k$ among the pieces of gray information GR1_1 to GR1_$m$, and may determine the calculated average value as gray information corresponding to another one of the second touch driving signals, that is, the second touch driving signal supplied to the second touch electrode TE23 during the first horizontal period. The control logic circuit 504 may read the level of the second touch driving signal corresponding to the gray information determined in the look-up table 501 in units of horizontal cycles and units of touch columns to record it in the column register 503.

The control logic circuit 504 may generate a plurality of pieces of first touch information based on each of the first touch sensing signals RHS1 to RHSx supplied from the first receiving circuits 311 during every horizontal period, a touch voltage difference between the first touch driving signals divided and recorded in the row register 502 in units of horizontal periods, and the level of the first touch driving signal. In converting the touch voltage difference into first touch information, the control logic circuit 504 may correct the touch voltage difference based on the level of the first touch driving signal.

Figure 11:
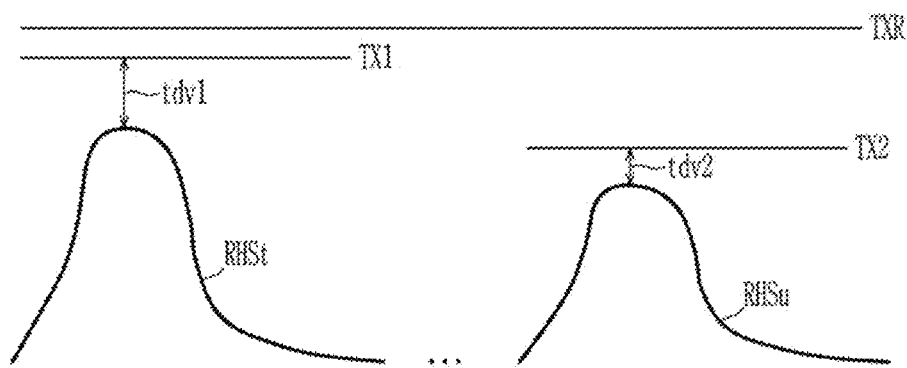
FIG. 11 illustrates a waveform diagram showing two first touch sensing signals having different gray information among a plurality of first touch sensing signals and a touch driving signal level corresponding to each of the first touch sensing signals.

FIG. 11 illustrates a waveform diagram showing two first touch sensing signals having different gray information from among a plurality of first touch sensing signals and a touch driving signal level corresponding to each of the first touch sensing signals.

As illustrated in FIG. 11, the control logic circuit 504 may derive touch voltage differences tdv1 and tdv2, which are differences between first touch sensing signals RHSt and RHSu and the levels TX1 and TX2 of the corresponding touch driving signal. Each of the touch voltage differences tdv1 and tdv2 illustrated in FIG. 11 may be a voltage difference generated when the first touch sensing signals RHSt and RHSu are lowered compared to the touch driving signals TX1 and TX2 as capacitance between the first touch electrode and the common electrode is lowered by a touch.

The source driver 322 may generate a source signal according to an image data signal IMD supplied from the timing controller 321, and the image data signal IMD may depend on gray information. For example, the level of the source signal may be determined according to the gray information, and the touch driving signal is determined according to the source signals corresponding to the touch driving signal, and thus the level of the touch driving signal may vary according to the gray information. To compensate for this problem, the control logic circuit 504 may adjust a gain for converting touch sensing signals into digital signals according to the gray information. The control logic circuit 504 may correct the touch voltage differences tdv1 and tdv2 by considering the level of the touch driving signal corresponding to each of the touch voltage differences tdv1 and tdv2.

For example, in a pixel circuit illustrated in FIG. 3, when a driving transistor TDR is a P-channel type transistor, as a gray level indicated by gray information increases, a level of a source signal may be low, and the gray level indicated by the gray information may be lowered, so the level of the source signal may be higher. In FIG. 11, the touch driving signal TX2 may be a touch driving signal when the gray information is high in comparison with the touch driving signal TX1. As the gray information increases, a level of a touch driving signal may decrease, and a touch voltage difference tdv, which may be a difference between a first touch sensing signal and a touch driving signal, may also be lowered. As a result, different touch information may be generated for a same touch input. In order to solve this problem, according to an embodiment, a touch voltage difference may be corrected based on a level of a touch driving signal that varies according to the gray information.

A method of correcting a touch voltage difference according to an embodiment may vary. The description provided below is only an example, and embodiments are not limited thereto. For example, the control logic circuit 504 may calculate a gain for adjusting the level of the touch driving signal to a certain reference level to amplify the touch voltage difference with the calculated gain. In FIG. 11, when a ratio of the touch driving signal TX1 to the reference level TXR is 0.9 and a ratio of the touch driving signal TX2 to the reference level TXR is 0.6, the control logic circuit 504 may calculate a ratio of the touch driving signal to the reference level TXR, and may generate an analog voltage obtained by amplifying the touch voltage difference tdv1 with a gain based on the calculated ratio, for example, a gain corresponding to a reciprocal of the ratio (1/0.9). The control logic circuit 504 may generate first touch information by digitally converting the generated analog voltage. In the same way, the control logic circuit 504 may generate the first touch information by digitally converting an analog voltage obtained by amplifying the touch voltage difference tdv2 with a gain corresponding to 1/0.6.

In embodiments, the control logic circuit 504 may control a clock frequency of a counter for converting an analog voltage into a digital signal to change according to the level of the touch driving signal. For example, the control logic circuit 504 may determine a first clock frequency f1 of a clock signal counting a time required for a ramp signal of a predetermined slope to reach the touch voltage difference tdv1 according to the ratio of 1/0.9. In the same way, the control logic circuit 504 may determine a second clock frequency f2 of the clock signal with respect to the touch voltage difference tdv2 according to a ratio of 1/0.6. The control logic circuit 504 may generate a digital signal indicating a counted result as touch information. The second clock frequency f2 may be 1.5 times faster than the first clock frequency f1, and thus touch information according to a result of counting the time for the ramp signal to reach the touch voltage chart tdv1 with the first clock frequency f1 and touch information according to a result of counting a time for the ramp signal to reach the touch voltage difference tdv2 with the second clock frequency f2 may be normalized.

The control logic circuit 504 may generate a plurality of pieces of second touch information based on each of the second touch sensing signals RVS1 to RVSy supplied from the second receiving circuits 312 during every horizontal period, a touch voltage difference between the second touch driving signals divided and recorded in the column register 503 in units of horizontal periods, and the level of the second touch driving signal. In converting the touch voltage difference into first touch information, the control logic circuit 504 may correct the touch voltage difference based on the second touch driving signal level corresponding to the touch voltage difference. The control logic circuit 504 may correct the touch voltage difference based on the level of the touch driving signal in the same manner as described above.

The control logic circuit 504 may generate touch sensing information TSI according to the pieces of first touch information and the pieces of second touch information.

Figure 12:
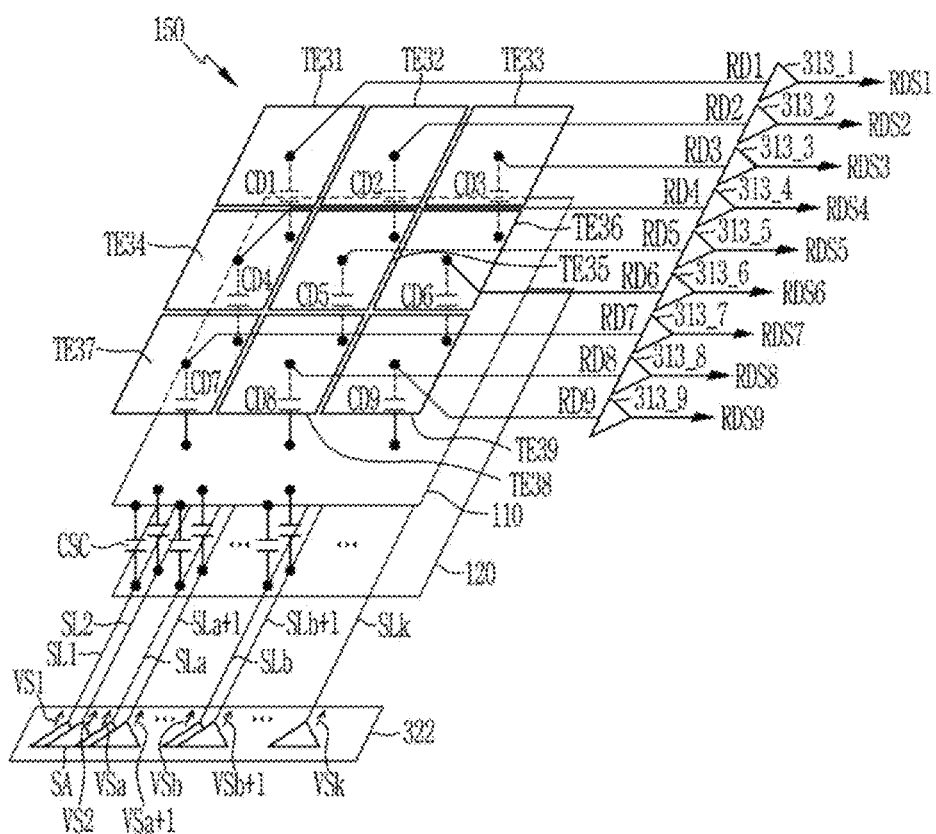
FIG. 12 illustrates a circuit diagram showing components related to driving for touch sensing in some areas of a touch display device having a dot pattern according to an embodiment.

FIG. 12 illustrates a circuit diagram showing components related to driving for touch sensing in some areas of a touch display device having a dot pattern according to an embodiment.

As illustrated in FIG. 12, unlike the line-based touch electrodes described above, a touch panel may be implemented using dot-patterned touch electrodes. In FIG. 12, some elements of the touch display device 1 are illustrated for convenience of description. Compared to embodiments FIG. 4, same reference numerals are applied to same elements, and redundant or duplicative descriptions of the elements may be omitted from the disclosure below. Specifically, FIG. 12 illustrates a plurality of touch electrodes TE31 to TE39 having a size of 3×3 in the touch panel 10 illustrated in FIG. 1.

In the touch panel 10, some regions corresponding to the 3×3 size are illustrated. Hereinafter, these regions may be referred to as a touch panel 150.

The touch electrodes TE31 to TE39 may be respectively connected to a plurality of receiving circuits 313_1 to 313_9. The common electrode 110 and the touch electrodes TE31 to TE39 may be coupled through a plurality of capacitors. In FIG. 12, a plurality of capacitors CD1 to CD9 formed between the plurality of touch electrodes TE31 to TE39 and the common electrode 110 are illustrated as an equivalent circuit. Unlike the touch electrodes in units of lines, the touch electrodes TE31 to TE39 of the dot pattern may sense a touch input at a position of each of the touch electrodes. Each of the receiving circuits 313_1 to 313_9 may generate a plurality of touch sensing signals RDS1 to RDS9 by amplifying each of a plurality of touch signals RD1 to RD9 received from the connected touch electrodes.

The source signals VS1 to VSk may be supplied to the source lines SL1 to SLk during every horizontal period. The plurality of source signals VS1 to VSa supplied to the source lines SL1 to SLa from among the source lines SL1 to SLk illustrated in FIG. 12 may be low-pass filtered by the capacitors CSC between the source lines SL1 to SLa and the common electrode 110, to be supplied as touch driving signals for a plurality of touch electrodes TE31, TE34, and TE37. The source signals VSa+1 to VSb supplied to the source lines SLa+1 to SLb may be low-pass filtered by the capacitors CSC between the source lines SLa+1 to SLb and the common electrode 110, to be supplied as touch driving signals for the touch electrodes TE32, TE35, and TE38.

The source signals VSb+1 to VSk supplied to the source lines SLb+1 to SLk may be low-pass filtered by the capacitors CSC between the source lines SLb+1 to SLk and the common electrode 110, to be supplied as touch driving signals for a plurality of touch electrodes TE33, TE36, and TE39.

A touch driving signal for each of the touch electrodes TE31 to TE39 may be supplied to each of the touch electrodes through the capacitors CD1 to CD9. A plurality of touch driving signals may be low-pass filtered by a resistance component between the capacitors CD1 to CD9 and the touch electrodes TE31 to TE39 and the receiving circuits 313_1 to 313_9, to be supplied to the receiving circuits 313_1 to 313_9 as the touch signals RD1 to RD9. For example, the touch driving signal TX31 may be low-pass filtered by a resistance component between the capacitor CD1 and the touch electrode TE31 and the receiving circuit 313_1, to be supplied to the receiving circuit 313_1 as touch signals RD1.

The touch processor 315 may receive the touch sensing signals RDS1 to RDS9 from receiving circuits 313_1 to 3139, and as described above, may generate touch sensing information TSI by correcting a touch voltage difference, which may be a difference between the level of the touch driving signal based on the gray information corresponding to each of the touch detection signals RDS1 to RDS9 and each of the touch electrodes TE31 to TE39 according to the level of each touch driving signal.

In the touch display device 1 according to an embodiment, a plurality of source signals supplied to the display panel may be filtered and provided as touch driving signals of the touch panel, thereby solving the problem of image flicker caused by interference caused by touch panel driving. In addition, because a driving circuit for generating a touch driving signal may not be required, a size and power consumption of the touch driving circuit may be reduced. In addition, even when a still image is displayed, for example in an always on display (AOD) mode, the touch drive circuit may continuously operate to detect a touch input, and according to an embodiment, it may not be necessary to supply a separate touch driving signal, so a low-power implementation of the touch display device may be provided. In addition, in the AOD mode, because an image displayed on the display panel may be a still image, there may be no change in the gray information. Accordingly, there may be no change in the touch driving signal according to the gray information, and thus a gain that converts the touch voltage difference into digital information may be fixed, which may be efficient for touch detection.

Figure 13:
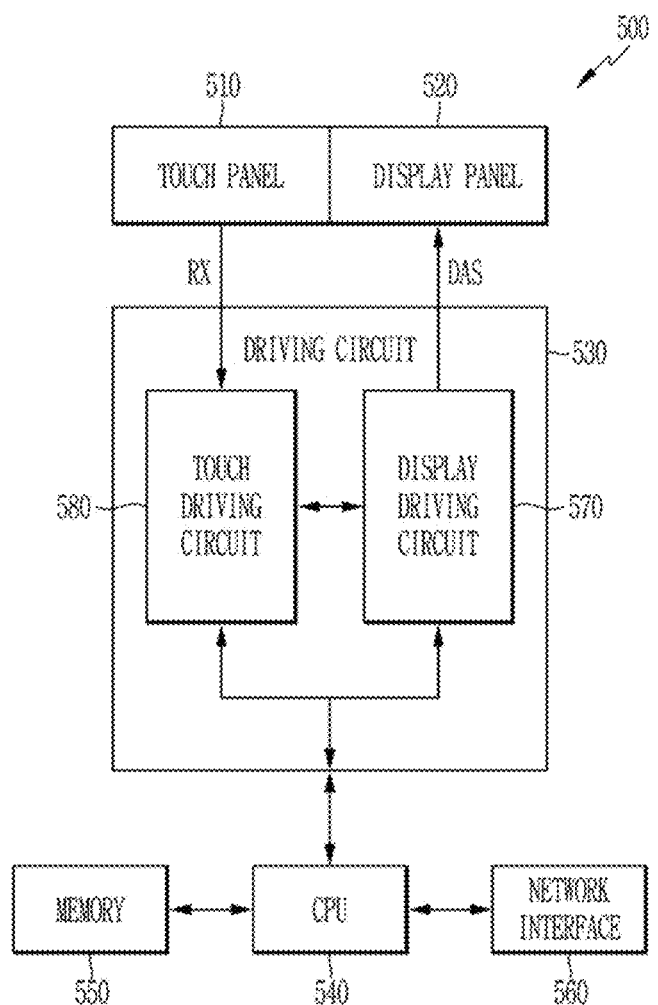
FIG. 13 illustrates a block diagram of a system including a touch display device according to an embodiment.

FIG. 13 illustrates a block diagram of a system including a touch display device according to an embodiment.

As illustrated in FIG. 13, the system 500 may include a touch panel 510, a display panel 520, a driving circuit 530, a CPU 540, a memory 550, and a network interface 560.

The CPU 540 may control an operation of the system 50X) by executing commands stored in the memory 550 or the CPU 540. For example, the CPU 540 may provide an image source to the driving circuit 530, may recognize an image displayed on the display panel 520 and a touch input detected through the touch panel 510, and may generate a control command for performing an operation corresponding to the touch input in response to the touch input. The CPU 540 may be implemented as a system-on-chip (SoC), or may include an application processor (AP).

The memory 550 may be accessed by the CPU 540, and for example, may include an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and the like as a non-volatile memory, and may include a dynamic random access memory (DRAM), a static random access memory (SRAM), mobile DRAM, a double data rate synchronous dynamic random access memory (DDR SDRAM), a low power DDR (LPDDR) SDRAM, a graphic DDR (GDDR) SDRAM, a Rambus dynamic random access memory (RDRAM), and the like as a volatile memory.

The network interface 560 may provide the CPU 540 with an interface to a network outside the system 500. For example, the network interface 560 may access a wired or wireless network, and may transmit a signal received from the network to the CPU 540, or transmit a signal received from the CPU 540 to the network.

The driving circuit 530 may be implemented as at least one chip, e.g., as a single chip disposed on a same substrate. The driving circuit 530 may include a display driving circuit 570 and a touch driving circuit 580. In embodiments, the driving circuit 530 may correspond to the driving circuit 30, the display driving circuit 570 may correspond to the display driving circuit 320, and the touch driving circuit 580 may correspond to the touch driving circuit 310. In embodiments, one or more of the driving circuit 530, the touch driving circuit 580 and the display driving circuit 570 may be, or may be included in, a display driver integrated circuit (DDI). Gray information used by the touch driving circuit 580 to generate touch information may be provided from the display driving circuit 570 within a same chip by implementing the display driving circuit 570 and the touch driving circuit 580 as a single chip. Accordingly, the system 500 according to an embodiment may not require a separate communication network for transmitting and receiving the gray information.

The touch panel 510 may be disposed on the display panel 520, may transmit an image displayed on the display panel 520, and may provide a plurality of touch signals RX corresponding to a touch input to the touch driving circuit 580. The touch driving circuit 580 may provide touch sensing information, for example touch sensing information TSI, to the CPU 540.

The CPU 540 may map a position of the touch input and a position on the display panel 520 according to touch sensing information, for example touch sensing information TSI, to recognize an object such as an icon, a menu item, or an image displayed on the display panel 520, and may perform a control operation corresponding to the recognized object.

The system 500 may be, or may be included in, a smart home appliance capable of performing an image display function and an operation according to the touch input. The system 500 may be applied to at least one of various medical devices (e.g., for magnetic resonance angiography (MRA), for magnetic resonance imaging (MRI), for computed tomography (CT), for a camera, for an ultrasound machine, etc.), for a navigation device, for a global positioning system (GPS) receiver), for an event data recorder (EDR), for a flight data recorder (FDR), for an automotive infotainment device, for ship electronics (e.g., for a ship navigation device, a gyrocompass, etc.), for avionics, for a security device, for an automotive head unit, for an industrial or domestic robot, for an automatic teller machine (ATM) in a financial institution, or for a point of sale (POS) system in a store, however embodiments are limited thereto.

While the disclosure includes description of particular embodiments, it is to be understood that the disclosure is not limited to the described embodiments, but is intended to cover various modifications and equivalent arrangements included within the spirit and scope of the appended claims.

What is claimed is:

1. A touch display device comprising:
a display panel comprising:
a plurality of source lines configured to provide a plurality of source signals to a plurality of pixels, and
a common electrode coupled to the plurality of source lines;
a plurality of touch electrodes coupled to the common electrode, and configured to provide a plurality of touch signals according to a plurality of touch driving signals received from the common electrode; and
a touch driving circuit configured to generate a plurality of pieces of touch information based on a difference between the plurality of touch signals and each of the plurality of touch driving signals, according to gray information displayed by the plurality of pixels.

2. The touch display device of claim 1, wherein a plurality of first source signals are provided to a plurality of first source lines, and
wherein a capacitor between the common electrode and the plurality of first source lines is configured to filter the plurality of first source signals to provide the plurality of touch driving signals to a plurality of first touch electrodes corresponding to the plurality of first source signals.

3. The touch display device of claim 2, wherein the plurality of first touch electrodes from among the plurality of touch electrodes extends in a first direction, and the plurality of source lines extends in a second direction,
wherein a touch driving signal from among the plurality of touch driving signals corresponds to a first touch electrode from among the plurality of first touch electrodes, and
wherein capacitors corresponding to the first touch electrode are configured to filter the touch driving signal to provide a touch signal.

4. The touch display device of claim 2, wherein a plurality of second touch electrodes from among the plurality of touch electrodes extends in a first direction, and the plurality of source lines extends in the first direction,
wherein a touch driving signal from among the plurality of touch driving signals corresponds to a second touch electrode from among the plurality of second touch electrodes, and
wherein capacitors corresponding to the second touch electrode are configured to filter the plurality of touch driving signals to provide a touch signal.

5. The touch display device of claim 2, wherein the plurality of touch electrodes are implemented in a dot pattern,
wherein a touch driving signal corresponds to a touch electrode from among the plurality of touch electrodes among the plurality of touch driving signals, and
wherein a capacitor corresponding to the touch electrode is configured to filter the plurality of touch driving signal to provide a touch signal.

6. The touch display device of claim 1, wherein the touch driving circuit comprises:
a plurality of receiving circuits configured to generate a plurality of touch sensing signals by amplifying the plurality of touch signals; and
a touch processor configured to generate the plurality of pieces of touch information by correcting a plurality of touch voltage differences between the plurality of touch sensing signals and the plurality of touch driving signals according to a level of each of the plurality of touch driving signals.

7. The touch display device of claim 6, wherein the touch processor comprises:
a look-up table configured to store levels of the plurality of touch driving signals corresponding to the gray information displayed by the plurality of pixels; and
a control logic circuit configured to:
determine the gray information associated with source signals corresponding to a touch electrode from among the plurality of touch electrodes in order to obtain a level of a touch driving signal corresponding to the determined gray information from the look-up table, and
generate the plurality of pieces of touch information by correcting a touch voltage difference between the obtained level and a touch signal based on the obtained level of the touch driving signal.

8. The touch display device of claim 7, wherein the control logic circuit is configured to:
divide first gray information corresponding to first frame into a plurality of pieces of first gray information corresponding to a plurality of horizontal periods, and
obtain a level of a first touch driving signal corresponding to a first touch electrode from among the plurality of touch electrodes from the look-up table based on a corresponding piece of first gray information from among the plurality of pieces of first gray information,
wherein the first touch electrode extends in a first direction which crosses a second direction in which the plurality of source lines extend.

9. The touch display device of claim 8, wherein the control logic circuit is further configured to determine an average of the plurality of pieces of first gray information as the corresponding piece of first gray information.

10. The touch display device of claim 7, wherein the control logic circuit is further configured to:
divide second gray information of frame into a plurality of pieces of second gray information corresponding to a plurality of horizontal periods and a plurality of touch columns, and
obtain a level of a second touch driving signal corresponding a second touch electrode from among the plurality of touch electrodes from the look-up table based on a corresponding piece of second gray information from among the plurality of pieces of second gray information,
wherein the second touch electrode and the plurality of source lines extend in a same direction.

11. The touch display device of claim 10, wherein the control logic circuit is further configured to:
determine an average of the plurality of pieces of second gray information of corresponding to a touch column as the corresponding piece of second gray information.

12. The touch display device of claim 7, wherein the control logic circuit is further configured to:
generate an analog voltage obtained by amplifying the touch voltage difference using a gain which is determined based on a ratio between the obtained level of the touch driving signal and a reference level, and
generate the touch information by digitally converting the analog voltage.

13. The touch display device of claim 7, wherein the control logic circuit is further configured to:
    based on a ratio between the obtained level of the touch driving signal and a reference level, adjust a clock frequency of a clock signal used to count an amount of time for a ramp signal to reach the touch voltage difference, and
    generate a digital signal indicating a result of the counting as the touch information.

14. The touch display device of claim 1, wherein each pixel of the plurality of pixels comprises an organic light emitting diode, and
    wherein the common electrode is connected to a cathode of the organic light emitting diode.

* * * * *